May 11, 1965  R. A. LEMBERGER  3,182,929
VERTICAL TAKE-OFF AND LANDING AIRCRAFT
Filed July 15, 1963  3 Sheets-Sheet 1

INVENTOR.
ROBERT A. LEMBERGER
BY Ralph W. Kalish

ATTORNEY

May 11, 1965 R. A. LEMBERGER 3,182,929
VERTICAL TAKE-OFF AND LANDING AIRCRAFT
Filed July 15, 1963 3 Sheets-Sheet 2
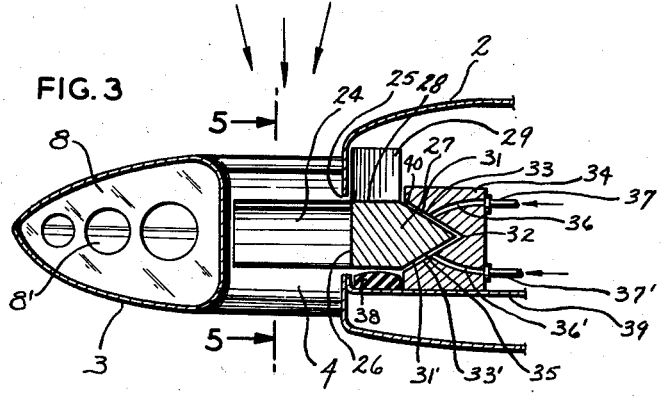
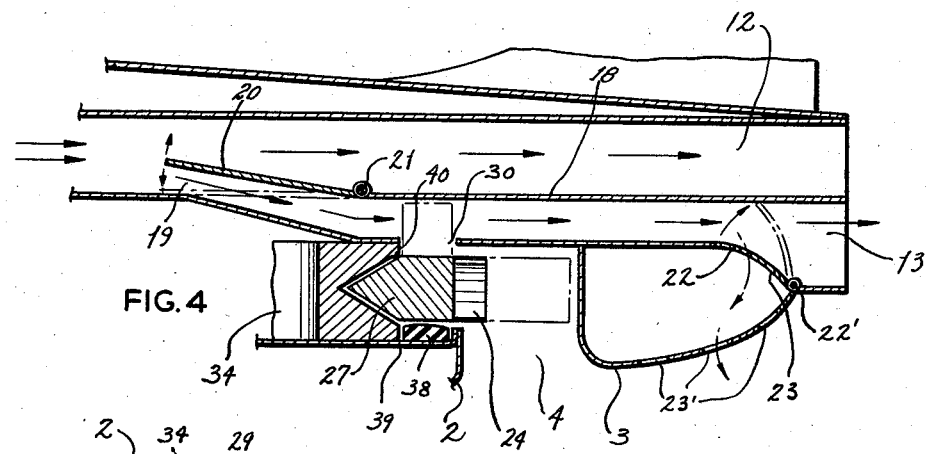
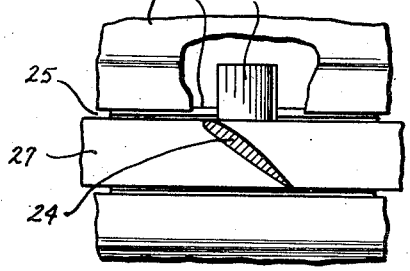
INVENTOR.
ROBERT A. LEMBERGER
BY
ATTORNEY May 11, 1965 R. A. LEMBERGER 3,182,929
VERTICAL TAKE-OFF AND LANDING AIRCRAFT
Filed July 15, 1963 3 Sheets-Sheet 3

INVENTOR.
ROBERT A. LEMBERGER
BY *Ralph N. Kalish*

ATTORNEY

United States Patent Office 3,182,929
Patented May 11, 1965

3,182,929
VERTICAL TAKE-OFF AND LANDING AIRCRAFT
Robert A. Lemberger, 2418 Amesbury, St. Louis 36, Mo.
Filed July 15, 1963, Ser. No. 294,814
3 Claims. (Cl. 244—12)

This invention relates in general to aircraft and, more particularly, to a jet propelled aircraft adapted for both horizontal and vertical flight.

It is an object of the present invention to provide an aircraft of the jet propulsion type incorporating novel lift producing means to permit directly vertical flight; thereby obviating the need for a take-off area of greater extent than that covered by the aircraft.

It is another object of the present invention to provide an aircraft wherein horizontal or vertical flight, or travel having both horizontal and vertical components, may be easily effected through novel utilization of exhaust gas flow.

It is another object of the present invention to provide an aircraft of the jet propulsion type which embodies a unique lift-producing mechanism adapted for maximum efficiency through substantially frictionless support means therefor.

It is another object of the present invention to provide an aircraft of the type stated wherein mechanical linkage is obviated between the primary power source and the lift producing means.

It is an additional object of the present invention to provide an aircraft of the type stated wherein the lifting mechanism is shielded from the air stream during horizontal flight thereby reducing friction and conducing to relatively increased speeds.

It is a still further object of the present invention to provide an aircraft of the jet propulsion type wherein the contour of the aircraft enhances lifting power during operation of the lifting mechanism while the aircraft is in flight.

It is a still further object of the present invention to provide an aircraft incorporating a novel air-supported rotor carrying both lift producing propeller blades and impeller type blades for rotor rotation.

It is another object of the present invention to provide an aircraft of the type stated which may be most economically produced; which incorporates a simplicity of parts and being hence resistant to break down; which is reliable and durable in usage; and which may be operated without highly developed skill.

Other objects and details of the invention will be apparent from the following description when read in connection with the accompanying drawings (3 sheets) wherein—

FIGURE 3 is a vertical transverse sectional view taken on the line 3—3 of FIGURE 2.

FIGURE 4 is a vertical transverse sectional view taken on the line 4—4 of FIGURE 2.

FIGURE 5 is a vertical transverse sectional view taken on the line 5—5 of FIGURE 3.

Figure 1:
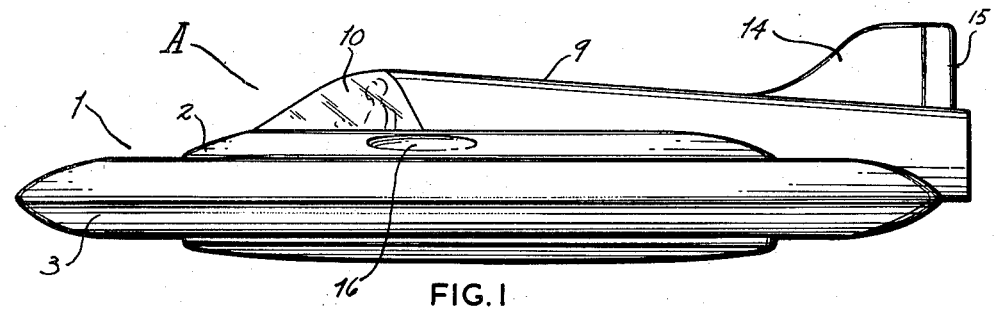
FIGURE 1 is a side elevational view of an aircraft constructed in accordance with and embodying the present invention.
Figure 2:
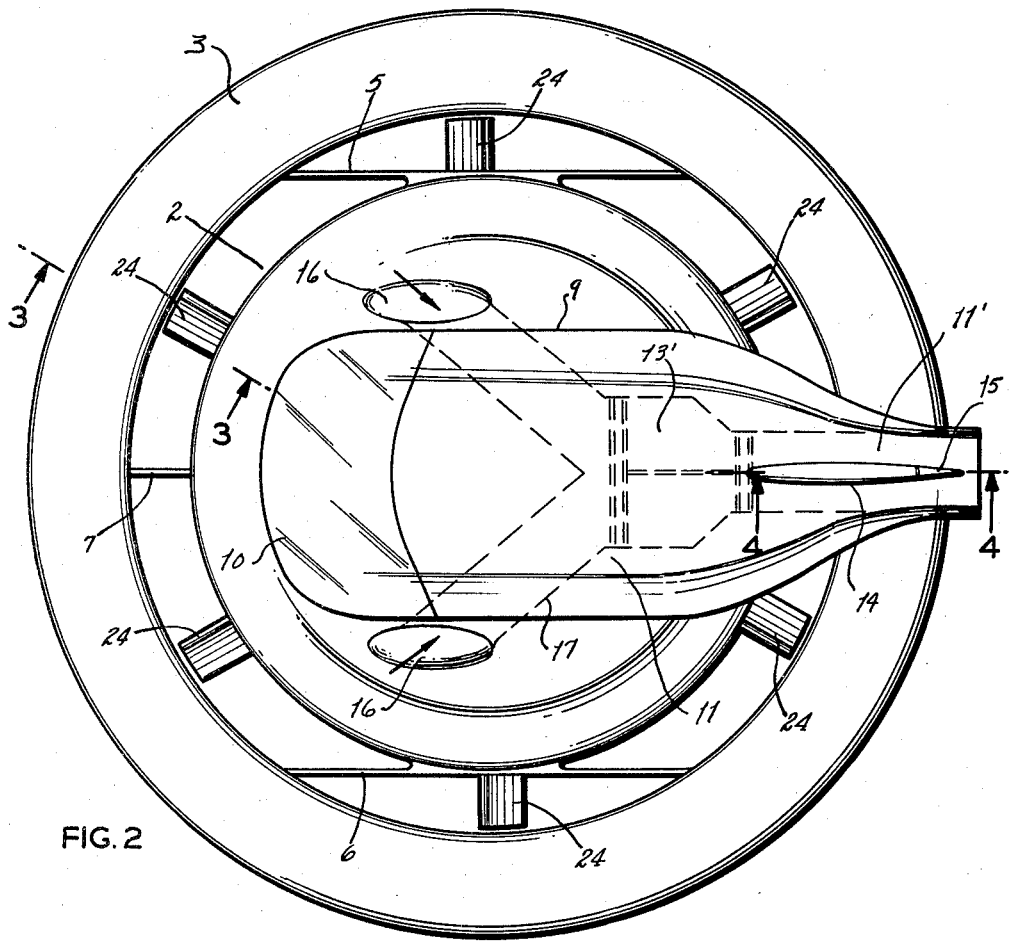
FIGURE 2 is a top plan view.

Referring now by reference characters to the drawings which illustrate the preferred embodiment of the present invention, A designates an aircraft comprising a horizontally disposed fuselage 1 of shallow, disc-like configuration presenting substantially an airfoil in cross-section. Fuselage 1 is constituted of inner and outer sections 2, 3, respectively, separated by an annular opening 4 extending vertically through fuselage 1; there being a plurality of struts or beams, as as 5, 6, 7 for stably interconnecting said sections 2, 3. As may be seen in FIGURE 3, outer section 3 which is of ring formation may be internally provided with a plurality of radially exending circumferentially spaced-apart, rigidifying partitions or bulkheads 8, punched at 8', if desired, for weight reduction. Formed with inner section 2 and projecting upwardly therefrom, in the central portion thereof, is an elongated enclosure 9 progressing rearwardly of aircraft A from a point proximate opening 4 and incorporating a forward pilot's compartment or cockpit 10, an intermediate housing portion 11 for a power plant, and a rearward end portion, indicated broadly 11', which is of converging or inwardly tapering character for defining the discharge ends of upper and lower gas exhaust ducts 12, 13, respectively. Duct 12 is connected at its forward end to an engine 13' of the jet or reaction type located within housing 11. The said rearward end portion 11' of enclosure 9 extends slightly outwardly of outer fuselage section 3 and is structurally integrated with both fuselage sections 2, 3, bridging opening 4, and thereby strengthening the union of sections 2, 3. Projecting upwardly from the upper rearward surface of enclosure 9 is a vertical stabilizer or fin 14 having a rudder 15 hinged thereto. Although not shown, it is apparent that aircraft A may be suitably provided with elevators and ailerons for control purposes. On fuselage section 2, laterally of both sides of compartment 10 of enclosure 9 there are provided air intake scoops 16, each of which communicates with a conduit 17 leading to the first stage of jet engine 13'.

Upper gas exhaust duct 12 embodies a bottom wall portion 18 having an opening 19 for communication with lower gas exhaust duct 13; said opening 19 being located in spaced rearward relationship to jet engine 13' so that there is no direct connection between the same. It will be noted that ducts 12, 13 are vertically aligned and axially parallel. Disposed for closure of opening 19 is a gas deflection plate 20 being swingably mounted along its rearward end margin upon wall portion 18, as by hinge 21 transversely related to duct 12; the said forward end of plate 20 being free. Conventional operating means (not shown) for remote control of plate 20 may be provided whereby the same may be selectedly positioned at any point within its arc of swing between full downward position for occlusion of opening 19, whereby exhaust gases will travel directly through duct 12, and full upward position wherein closure of upper duct 12 is effected so that the exhaust gases from jet engine 13' are diverted into lower duct 13. It is recognized that any dispositions of plate 20 between its upper and lower limits will permit of flow of exhaust gases simultaneously through both ducts 12, 13 with the relative proportions thereof corresponding to the extent or degree of allowed ingress into duct 13.

Inwardly of the outer or discharge end of lower duct 13 is a baffle plate 22 pivotally mounted, as at 22' along its lower edge upon the proximate outer marginal portion of fuselage section 3; said plate 22 being curvate for conforming to the curvature of the adjacent portion of said fuselage section 3 so that when in full downward position it will form an integral part of the upper wall thereof, allowing relatively unimpeded discharge flow of exhaust gas thereover. In full upper position, as indicated in phantom lines in FIGURE 4, plate 22 serves to close lower duct 13 causing gases impinging thereagainst to be diverted downwardly for emission to the atmosphere through opening 23 and openings 23' formed in the upper and lower walls respectively of fuselage section 3 which latter may thereby serve as a muffler. Conventional remote control means may be provided for operation of plate 22.

Presented for disposition within, and travel about, annular opening 4 is a series of propeller blades 24 which extend horizontally across said opening with their outer ends terminating in close proximity to the inner wall of section 3. Said blades 24 project at their inner ends through a continuous aperture 25 formed in the outer wall of inner fuselage section 2 confronting opening 4 for fixed engagement upon the outwardly directed face 26 of an annular rotor 27 carried within inner fuselage section 2 and adapted for rotation about a vertical axis; the mounting means for said rotor 27 being presently described. Propeller blades 24 are of less height than opening 4 and are contoured to form an airfoil in cross-section; said blades 24 being also canted or inclined to the vertical to present the leading edges thereof upwardly for projection into the stream of air drawn into, and hence through, said opening 4 for effecting lift of aircraft A in accordance with recognized aerodynamics principles. Blades 24 are thus located circumferentially about rotor 27 and extend radially therefrom. Said blades may be of any selected number depending upon desired characteristics.

Within fuselage section 2 and extending upwardly from the upper surface 28 of rotor 27, in axial normal relationship to blades 24 is a series of impeller blades or vanes 29 which latter are in circumferentially spaced relationship about rotor 27. Each blade 29 is transversely arcuated to provide an impingement surface for exhaust gases flowing through duct 13; the said blades 29 moving across duct 13 by traverse through suitably formed openings such as at 30. From the foregoing it is evident that motive force for effecting rotation of annular rotor 27 is provided by the exhaust gases traveling through duct 13 and acting upon blades 29. The relative amount of exhaust gases in duct 13 will determine the speed of rotation of rotor 27 with attendant, commensurate suctional forces being developed by propeller blades 24 for drawing air downwardly through opening 4, as indicated by arrows in FIGURE 3, for according lift to aircraft A.

Figure 6:
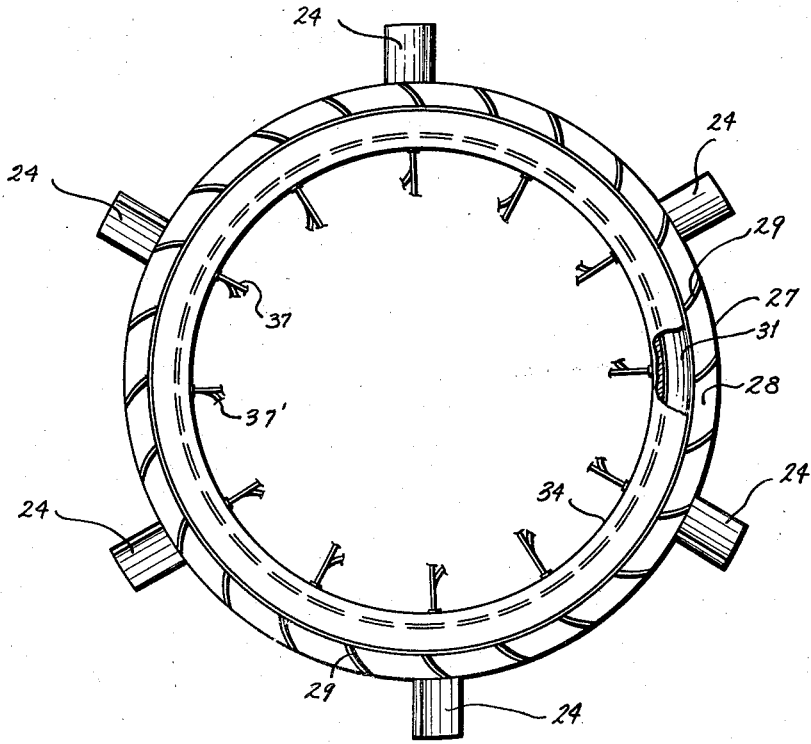
FIGURE 6 is a top plan view of the annular rotor.

The inwardly presented face of rotor 27 is tapered, being V-shaped in cross-section so as to provide upper and lower converging bearing surfaces 31, 31' for reception within a complementary recess or bearing 32 having wall portions 33, 33' respectively opposed to bearing surfaces 31, 31'; said recess 32 being formed in the outer face of an annular support or base 34 mounted fixedly within inner fuselage section 2. Provided between bearing surfaces 31, 31' and the opposed wall portions 33, 33' of recess 32 is a minute spacing as designated 35 into which open ports 36, 36' in recess wall portions 33, 33', respectively, and which are connected to conduits 37, 37', respectively, progressing through base 34 for connection to a source of compressed air or pressurized gas, such as from jet engine 13'. Air discharged through ports 36, 36' will fill spacing 35 and present a thin film between rotor 27 and base 34 which provides a substantially frictionless support for rotor 27, obviating any metal-to-metal contact so that rotor 27 may rotate at relatively elevated speeds in a highly efficient manner. The number of ports 36, 36' and associated conduits 37, 37' is patently determined by consideration of structural and operational factors so that the number of such shown in FIGURE 6 is merely for purposes of illustration and not limitation.

For supporting rotor 27 when the same is not in operation there is provided an annular bumper bearing 38 mounted on a deck 39 within inner fuselage section 2 and disposed for engaging the under face of rotor 27 (FIGURE 4). In order to prevent inadvertent contact between the upper inner face portion of rotor 27 and base 34, there is affixed to the confronting outer portion of said base 34 a plurality of circumferentially spaced detents 40.

In view of the foregoing, it will thus be seen that with the power source of aircraft A being fully energized gas will be exhausted into duct 12. With aircraft A on the ground or on any other suitable departure surface, vertical take-off is effected by positioning deflection plate 20 in full upward position thus closing duct 12 and fully opening duct 13 whereby the exhaust gases will be diverted into the latter. Closure of baffle plate 22 may be effected so that no gases will be discharged rearwardly of the craft and create a horizontal thrust. The exhaust gases will thereby impinge upon power blades 29 to generate revolution of rotors 27 with consequent rotative movement of propeller blades 24 within opening 4. As the speed of rotation of rotor 27 increases with attendant increase in the angular velocity of blades 24, air from the atmosphere will be drawn downwardly through opening 4 with the stream thereof acting upon blades 24 for providing lift to aircraft A which will thus rise directly vertically in a path normal to the take-off surface. There is thus obviated any need for a runway or other extensive ground area as there is no horizontal component of travel in the take-off. After aircraft A has reached a desired heighth, deflection plate 20 may be lowered to permit flow of exhaust gas through duct 12 to impart a horizontal thrust to the craft and thereby produce a horizontal component of travel. With deflection plate 20 lowered in full downward position, maximum horizontal thrust will be developed so that aircraft A will maintain substantially level horizontal flight as any vertical component will be denied since rotation of rotor 27 is substantially arrested through cessation of supply of exhaust gases for direction against power blades 29; any inertia factor being minimal. Aircraft A may thus continue its flight at any selected altitude, and by operation of rudder 15 effect any indicated course changes. If it is desired to increase elevation during flight, then positioning of plate 20 in a selected intermediate attitude will allow gas to flow simultaneously through ducts 12 and 13 with the fraction or portion moving through the latter serving to effect rotation of rotor 27 to bring about necessary lift and thereby provide a vertical travel component; while gas exhausted through duct 12 will continue to promote horizontal thrust resulting in the craft following an upwardly inclined direction. Thus, with deflection plate 20 between its limits of swing, aircraft A will be accorded both a horizontal and a vertical component of movement, with the lift power being directly related to the extent of opening 19 as the greater the speed of rotation of rotor 27 the greater the "pull" of blades 24. It should be noted that with baffle plate 22 open gas traveling through duct 13 will also effect some horizontal thrust.

In view of the above, it may be seen that aircraft A is capable of extremely sensitive controlled operations as by relatively fine adjustments of positionment of plate 20, aircraft A may travel vertically, horizontally, or through paths having both vertical and horizontal components with the relative strengths of such components being determined by the proportionality of the exhaust gases traveling through ducts 12 and 13. As stated above, the baffle plate 22 may be open or closed depending upon whether any horizontal thrust is desired from gases directed into duct 13. Thus, especially on take-off, such plate should desirably be closed.

Therefore, the present invention provides a unique aircraft adapted for direct vertical flight as well as horizontal flight which incorporates unusual control means for effecting such flight. There is obviated any mechanical linkage between the power source and the lifting device. The power blades and lift-producing blades are carried upon an air-mounted rotor so that friction is substantially eliminated and marked efficiency is developed. The unusual control mechanism of the present invention permits the aircraft to be designed as a unitary airfoil thereby promoting ease of movement through the atmosphere.

It is to be recognized that various expedients may be readily utilized for controlling the aircraft during vertical flight so as to limit the effects from pitch, roll or yaw. Among such expedients might be the provision of nozzles for direction of the exhaust gases in an appropriate manner. Also, plates or other baffle means may be used for inhibiting lift, which plates could project into the lower portion of opening 4. Additionally, various propeller arrangements could be embodied, such as the propellers conventionally mounted on the booms of helicopters. Still further, there might be utilized a means for shifting the center of gravity of the aircraft in accordance with practices well known. Thus, the foregoing expedients are merely mentioned to indicate that aircraft A is capable of incorporating means for effectively controlling same during vertical flight, but such do not constitute elements of the present invention.

It should be understood that changes and modifications in the formation, construction, arrangement, and combination of the several parts of the aircraft may be made and substituted for these herein shown and described without departing from the nature and principle of my invention.

Having thus described my invention, what I claim and desire to secure by Letters Patent is:

1. An aircraft comprising a fuselage, a power source provided in said fuselage, said fuselage having first and second gas exhaust ducts extending longitudinally of the fuselage and being disposed horizontally therein, said first duct being connected at its inner end to said power source and being in immediate overlying relationship with respect to said second duct, said second duct opening into said first duct at a point spaced from said power source, said first and second ducts being axially parallel and having outer, vertically aligned discharge ends, a closure plate presented across said opening for controlling gas flow between said first and second ducts, said closure plate being pivotally mounted for swingable movement between a first limit wherein it fully occludes said opening for preventing gas flow through said second duct and a second limit wherein it fully occludes said first duct for preventing gas flow therethrough, adjusting means for maintaining said closure plate in any selected position between said first and second limits for allowing of simultaneous gas flow through said first and second gas ducts for flight attitude control purposes, said second duct having a downwardly directed opening adjacent its discharge end, a baffle plate hingedly provided within said second duct between said downwardly directed opening and said discharge end for movement between a first position wherein it closes said discharge end for directing gas flow downwardly through said opening and a second position wherein it closes said opening to allow gas flow through said discharge end, an annular rotor mounted on said fuselage for rotative movement about a vertical axis, a plurality of first blades carried on said rotor and extending radially therefrom, a plurality of second blades carried on said rotor and extending upwardly therefrom in axial normal relationship to said first blades, said first blades being presented beneath said second duct, there being an aperture in said second duct in the portion thereof confronting said first blades, said second blades extending upwardly through said aperture in said second duct for projection thereinto for presentation within the path of exhaust gas directed thereinto by positionment of said closure plate whereby the impingement of said gas upon said second blades will effect relative movement of said rotor, said aperture being located between said closure plate and said baffle plate.

2. An aircraft as defined in claim 1 and further characterized whereby said fuselage is provided with a circular opening for atmospheric air flow therethrough, said first rotor blades extending into said circular opening for vertical propulsion purposes, said first and second gas ducts being located above said circular opening, and said second rotor blades being disposed inwardly of said circular opening.

3. An aircraft as defined in claim 2 and further characterized by said annular rotor having bearing surfaces, a base member having recesses complementarily formed with respect to said rotor bearing surfaces for receiving same, and means for introducing a film of gaseous matter between said recesses and the rotor bearing surfaces for effecting a gas mounting for said rotor.

References Cited by the Examiner
UNITED STATES PATENTS

| | | | |
|---|---|---|---|
| 1,471,764 | 10/23 | Wheeler | 244—52 |
| 2,863,621 | 12/58 | Davis | 244—23 |
| 2,916,332 | 12/59 | Pavlecka. | |
| 3,080,137 | 3/63 | Hurel | 244—12 |
| 3,085,770 | 4/63 | Sutton | 244—23 |

FERGUS S. MIDDLETON, *Primary Examiner.*
RALPH D. BLAKESLEE, MILTON BUCHLER,
*Examiners.*